United States Patent [19]

Landheer

[11] 4,360,553
[45] Nov. 23, 1982

[54] SANDWICH PANEL

[75] Inventor: Hugo A. J. Landheer, Spijkenisse, Netherlands

[73] Assignee: Hunter Douglas International N.V., Curacao, Netherlands Antilles

[21] Appl. No.: 234,914

[22] Filed: Feb. 17, 1981

[30] Foreign Application Priority Data

Feb. 16, 1980 [NL] Netherlands ............. 8000975

[51] Int. Cl.³ ............... B32B 3/04; B32B 3/06
[52] U.S. Cl. .................... 428/45; 52/578;
52/594; 52/595; 52/631; 428/53; 428/54;
428/58; 428/83; 428/174; 428/192; 428/920
[58] Field of Search ............. 428/45, 53, 54, 58,
428/174, 192, 920, 83; 52/578, 579, 594, 595,
631

[56] References Cited

U.S. PATENT DOCUMENTS 4,095,388 6/1978 Breault ........................ 156/71
4,236,366 12/1980 Rijnders .................... 52/595

FOREIGN PATENT DOCUMENTS 140029 1/1966 Netherlands .

Primary Examiner—Paul J. Thibodeau
Attorney, Agent, or Firm—Pennie & Edmonds

[57] ABSTRACT

A rectangular sandwich panel comprises two skins with an insulating material, such as foam, sandwiched therebetween. Two spaced apart arms form a double tongue on each of two adjacent circumferential edges of the panel and a cooperable double groove is formed along the other two adjacent circumferential edges, whereby, without additional coupling means, the panel can be assembled on all sides by a tongue and groove connection with adjoining panels. At the corner of the panel, where two double tongues meet, the arms of the double tongues are cranked so that the spacing between the arms forming the double tongues is increased by the thickness of the arms, to accommodate the arms of double tongues of an adjoining panel.

4 Claims, 8 Drawing Figures

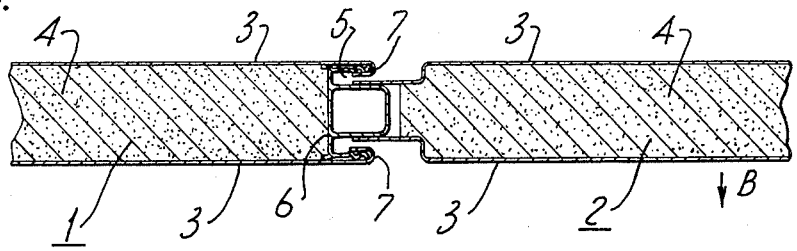
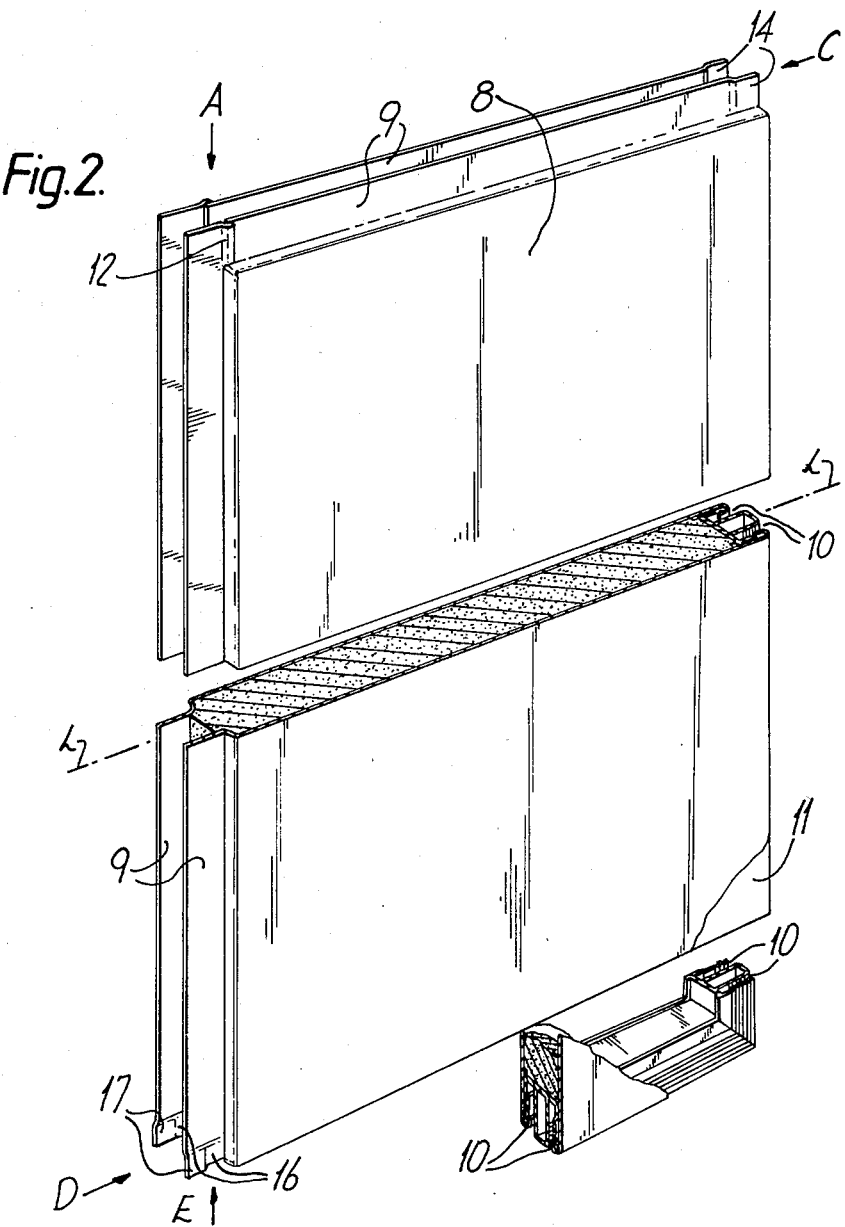

SANDWICH PANEL

DESCRIPTION

The present invention relates to a sandwich panel.

One type of sandwich panel comprises two skins, with an insulating material, such as foam, sandwiched therebetween, two opposite edges of the panel being provided with a tongue and groove, in particular a double tongue and groove. Such panels are described in Netherlands Pat. No. 140,029, and are marketed under the trademark "Luxalon".

Panels of the abovementioned type can readily be assembled with one another in large lengths to form, for example, an entire facade cladding, but the end edges which are not provided with tongues and grooves have to be assembled, for example, by pushing them into appropriate U-shaped rails.

According to the present invention, there is provided a rectangular panel comprising two skins, an insulating material sandwiched therebetween, two spaced apart arms forming a double tongue along each of two adjacent circumferential edges of the panel and a cooperable double groove formed along the other two adjacent circumferential edges, whereby, without additional coupling means, the panel can be assembled on all sides by a tongue and groove connection with adjoining panels, which are provided, at least at their connecting edges, with cooperating grooves or tongues to form a continuous wall.

While with the known panels it is practically exclusively possible to work in one connecting direction, the panels according to the invention can also be used for connecting in the transverse direction, and the possibility exists of connecting short panels, for example crosswise, to long panels, whereby the number of connecting possibilities is very greatly increased. The last-mentioned aspect is particularly important in the case of connecting panels, for example, on doors and frames in facades.

By applying the invention to a panel which is bent or curved at an angle of 90°, a greater freedom of design becomes possible, and the same is true, according to the invention, if the panel element is bent or curved so as to have a Z-shape.

A number of the panels can be brought together at a corner point, in which case, according to a preferred feature, at the corner of the panel, where two double tongues meet, the arms of the double tongues are offset so that the spacing between the arms forming the double tongues is increased by the thickness of two arms, to accommodate the arms of the double tongue of an adjacent panel.

The invention also provides an integral wall covering which is composed or partly composed of a number of interconnected panels of the same or different shape and/or dimensions according to the invention. The great variety of shape and/or dimensions of panels permits practically unlimited application by the architect.

In order that the invention will be more fully understood, the following description is given, merely by way of example, reference being made to the accompanying drawings, in which:

FIG. 1 is a partial top plan view of two panels having a double tongue and groove connection;

FIG. 2 is a perspective view of one embodiment of panel according to the invention, which, for the sake of clarity, is also shown in section and which, in addition, shows in detail the construction of the transition of a double groove at a corner point;

Figure 3:
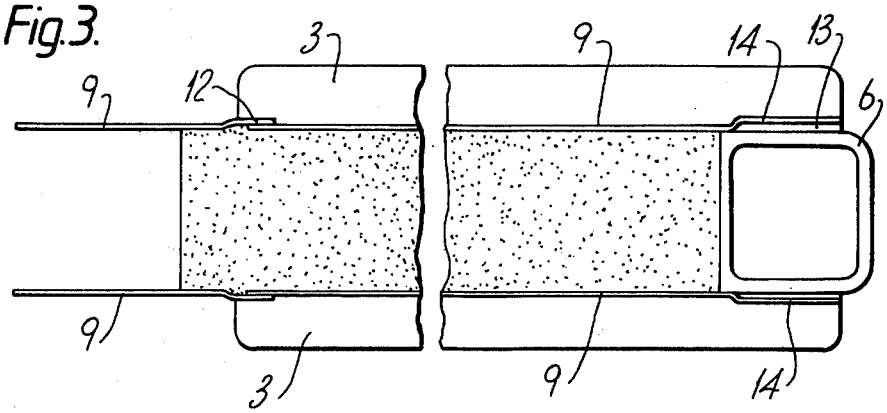
FIG. 3 is a partial top plan view of the panel shown in FIG. 2, viewed in the direction of the arrows A and B.

FIG. 1 shows the known double tongue and groove connection in sandwich panels. The two panels 1 and 2 consist of an outer sheeting 3 composed of lacquered or painted aluminium sheet, with an interposed layer of polyurethane foam 4. The double groove 5 is formed by a profile 6 of plastics material, of which the ends are held in the folded-over edges 7 of the outer sheets. This construction is known and needs no further explanation. The tongue 9 is double and formed of two spaced apart arms which consist of the continuous edges opposite the folded-over edges 7 of outer sheeting 3, which are bent inwards. In known panels of double tongue and groove joints are provided only on the opposite longer sides, so that a lateral connection as shown in FIG. 1 is obtained.

FIG. 2 shows a panel according to the invention, which in section on the line L—L has the same double tongue and groove connection as in FIG. 1. A cross-section in FIG. 2 shows a similar tongue and groove, of which only a part is shown in detail at the bottom. The panel 8 is provided along two sides with a continuous double tongue 9, while the other sides are provided with a continuous double groove 10, the connection of which at the bottom corner point 11 is shown in detail and is made at an angle of 45°.

Figure 8:
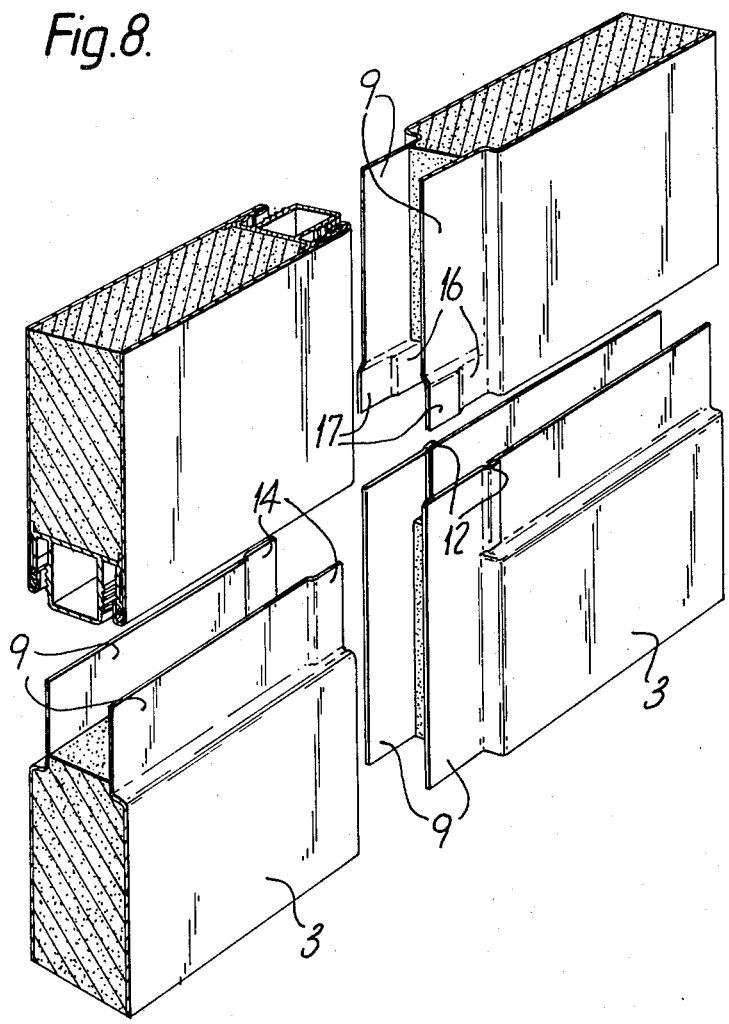
FIG. 8 is a partial sectional exploded view illustrating the manner in which four panels constructed according to the invention are joined together.

Through the use of a panel 8 in such a manner that it can be connected along all its peripheral edges to other panels 8 it is necessary always to provide additional space on the groove edges, for example, of four panels, where these edges meet at a corner point as shown in FIG. 8, in order to permit the insertion of the tongues 9 into the grooves 10 of the neighbouring panel 8. FIGS. 3 to 6 show how this can be done.

FIG. 3 indicates how the outer sheeting 3 is cut through locally at 3' when it is offset during the shaping operation, and then pressed flat at 12. On the right in FIG. 3 is shown the space 13 for the insertion of the continuous double tongue 9 of a neighboring panel. This space is formed by providing additional widening 14 in the tongue 9 at the corner point, the length of this widening being roughly equal to or slightly greater than the depth to which the tongue 9 of the neighbouring panel is inserted.

Figure 4:
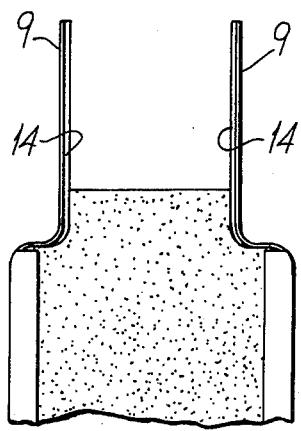
FIG. 4 is a partial side view in the direction of the arrow C in FIG. 2.
Figure 5:
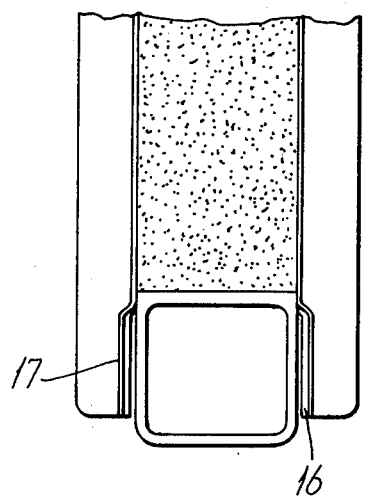
FIG. 5 is a partial side view in the direction of the arrow D in FIG. 2.
Figure 6:
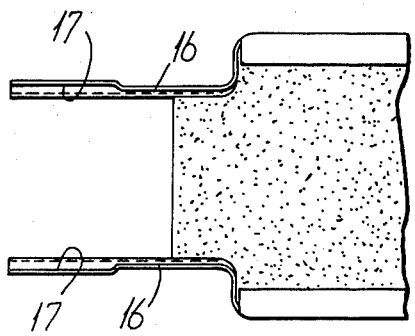
FIG. 6 is a partial view in the direction of the arrow E in FIG. 2.

Similar provision must be made for the connection points indicated in FIGS. 4 to 6. The local widenings are designated 14 in FIG. 4, while in FIG. 5 two local widenings can be seen, the first widening designated at 17 being intended for the lateral connection of two panels 8 and the second (17) for the point of connection of two joined panels 8 above the first two. The widenings 16 and 17 for a corresponding connection point are also shown in FIG. 6. The dimensions of the widenings 14, 16, 17, are determined by the single or double thickness of the outer sheeting 3 and the largest possible depth of insertion of the tongue into the groove, as shown for example in FIG. 1. With a relatively slight thickness of the outer sheeting 3 and a groove width which can easily take the additional widenings described above (see FIG. 1), connection does not give rise to any problems. Thus it is possible to use long or short panel lengths without the connection transitions being hindered by the additional widenings.

Figure 7:
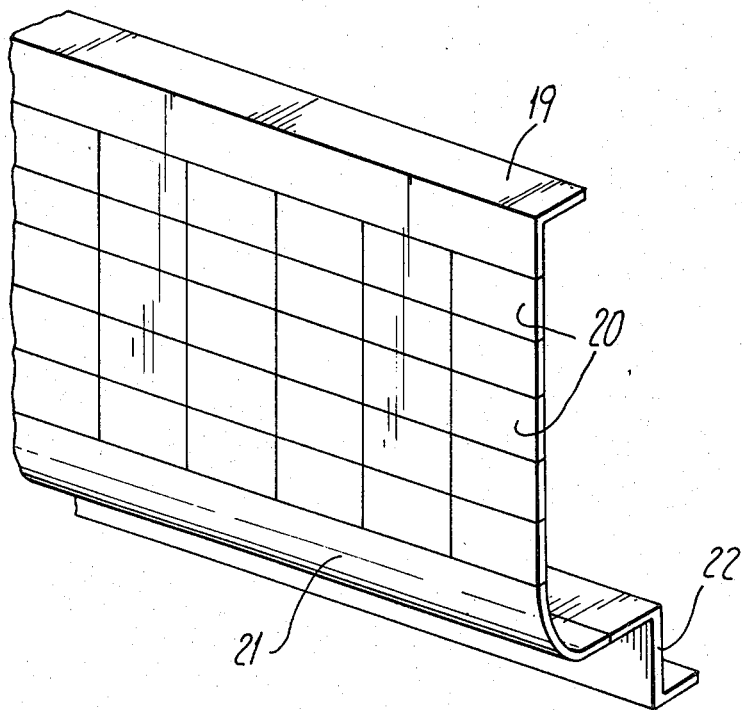
FIG. 7 shows diagrammatically some possible applications of panels according to the invention.

An example of the use of panels according to the invention is shown in FIG. 7. An integral panel wall is formed by assembling an angular panel 19, which is provided with double tongue and grooving only on two opposite sides, to a number of panels according to the invention, which are designated 20. At the bottom another connection is made by means of a panel 21 bent over an angle of 90°. A Z-shaped panel 22 can also be fitted at the bottom. For the angular panel 19 use can now be made of existing panels which are known for vertical fitting in facade coverings. However, the otherwise obligatory line pattern can now be interrupted by transversely directed shorter panels 20 according to the invention. Moreover, those provided at the bottom can cooperate with known elongated panels, such as the curved panel 21 or the Z-shaped panel 22.

On the other hand it is also possible for the pattern of the panels 20 to be continued downwards and/or upwards into the angular or curved panels 19, 21, and 22, when these are provided with the continuous edges 9 and 10 containing the double tongue and groove connections.

When windows and doors are provided, simple adaptation can now be achieved through the versatility of peripheral connection of the panels according to the invention. The assembly of these panels quickly supplies a strongly joined structure because of the double tongue and groove connections. This integral wall simply needs to be fastened to a supporting construction in a manner known per se, with the aid of fastening means engaged in the grooves. In view of the fact that neither the fastening means nor the supporting construction is necessary for the good understanding of the invention, in this connection reference is made to instruction and assembly manuals for "Luxalon" sandwich panels.

The expression "closed, integral wall" also includes a wall which for the most part comprises sandwich panels according to the invention, whether or not they are assembled with appertaining constructional elements such as windows and doors.

I claim:

1. A rectangular sandwich panel comprising two skins, an insulating material sandwiched therebetween, two spaced apart arms forming double tongues along each of two adjacent circumferential edges of the panel and cooperable double grooves formed along the other two adjacent circumferential edges, whereby, without additional coupling means, the panel can be assembled on all sides by a double tongue and groove connection with neighboring panels, which are provided, at least at their connecting edges, with cooperable double grooves or tongues to form a continuous wall and wherein at a corner of the panel where double tongues are adapted to meet double tongues of a neighboring panel, the arms of the double tongues are offset so that the spacing between the arms forming the double tongues is increased by at least the thickness of two arms, to accommodate the arms of the double tongues of the neighboring panel while at an opposite corner of the panel where double tongues are adapted to meet and be accommodated in double grooves, the arms of the double tongues at the opposite corner are also offset outwardly.

2. The sandwich panel according to claim 1, wherein the panel is bent or curved over an angle of 90°.

3. The sandwich panel according to claim 1, wherein the panel is bent or curved to form a Z-shape.

4. The rectangular sandwich panel of claim 1 wherein the arms of the double tongues at the corner are offset so that the spacing between the arms forming the double tongue is increased by the thickness of two arms, and wherein the offset part of the arms of the double tongues at the opposite corner are additionally offset outwardly over about half of its outer surface by the thickness of an arm to accommodate an offset arm part of a neighboring panel.

* * * * *